Figure 4:
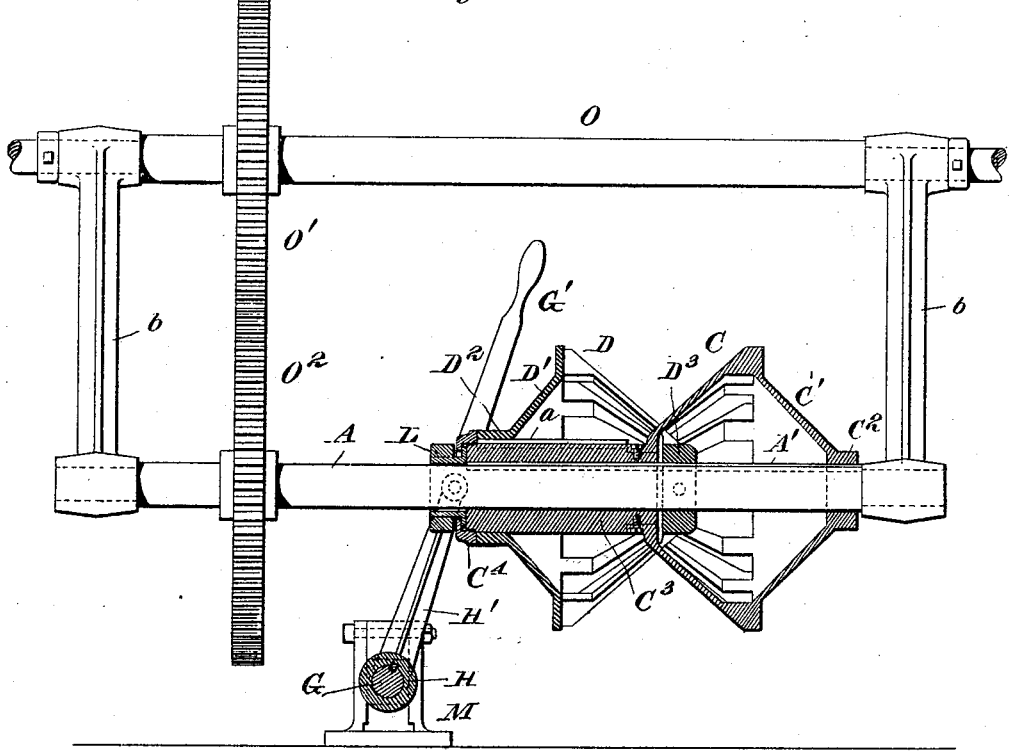

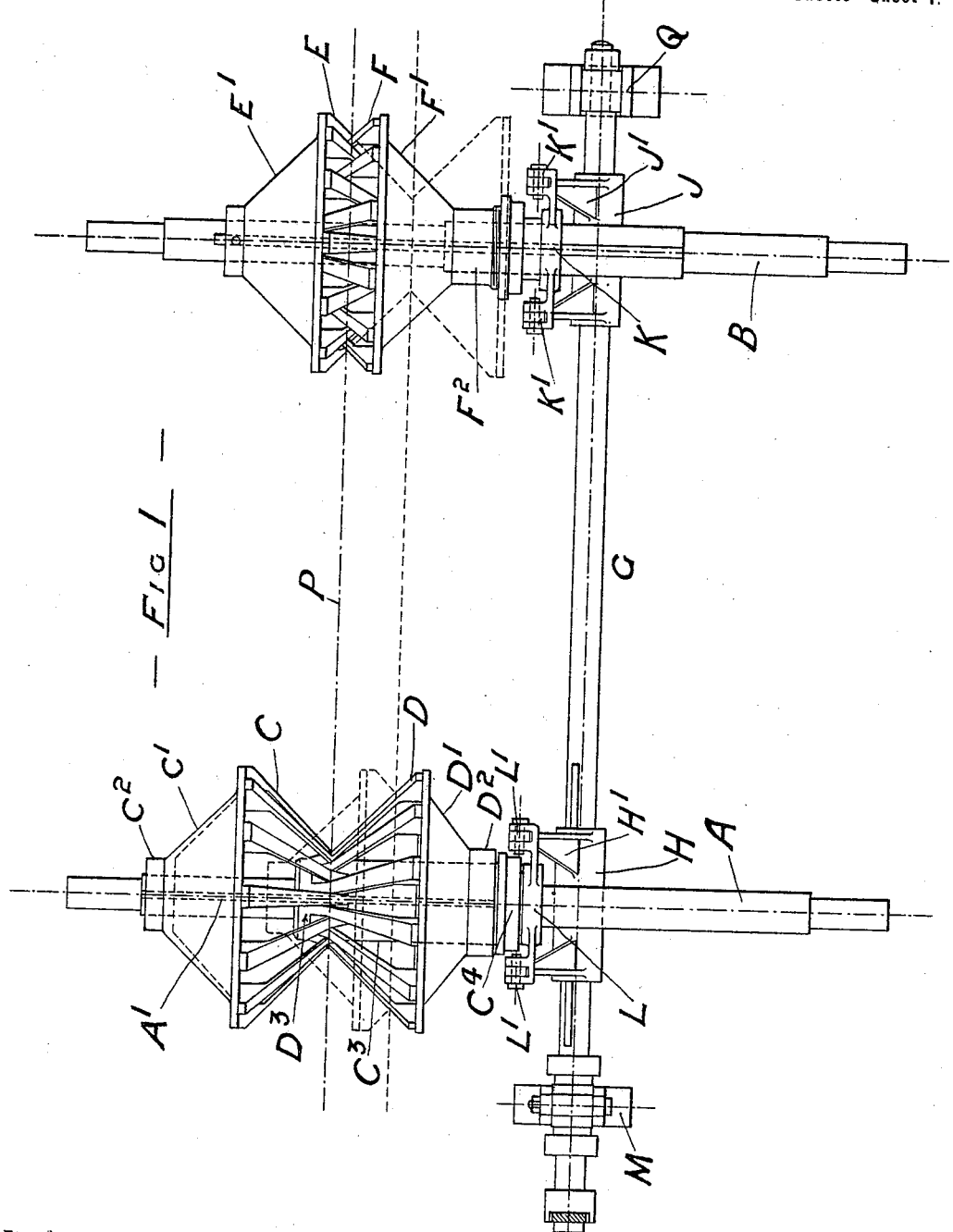

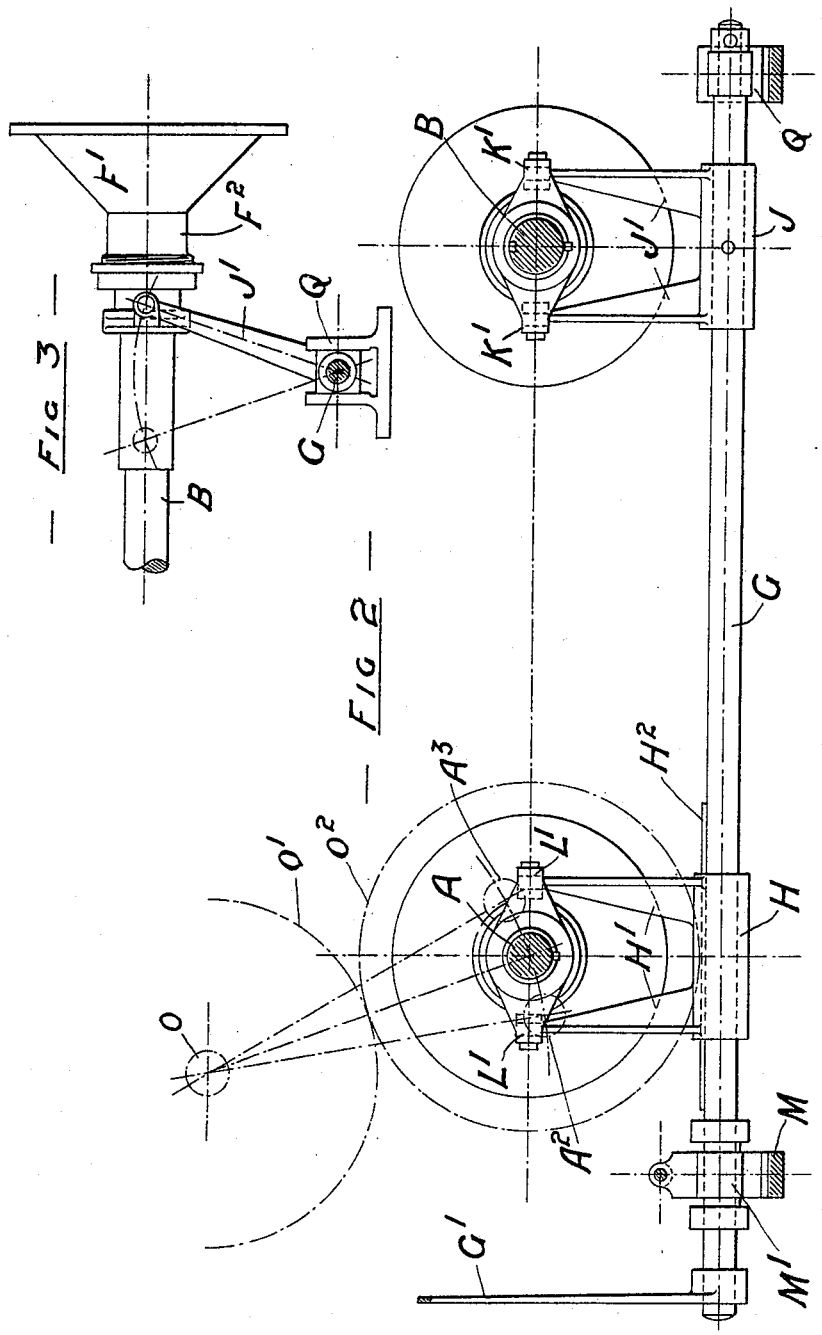

UNITED STATES PATENT OFFICE.

THOMAS A. EDISON, OF LLEWELLYN PARK, NEW JERSEY, AND CHARLES M. JOHNSON, OF REDHILL, ENGLAND.

EXPANDING PULLEY.

SPECIFICATION forming part of Letters Patent No. 641,281, dated January 16, 1900.

Application filed April 24, 1899. Serial No. 714,340. (No model.)

*To all whom it may concern:*

Be it known that we, THOMAS A. EDISON, residing at Llewellyn Park, in the county of Essex and State of New Jersey, and CHARLES M. JOHNSON, residing at Redhill, in the county of Surrey, England, citizens of the United States, have invented certain new and useful Improvements in Expanding Pulleys, of which the following is a specification.

Our invention relates to various new and useful improvements in expanding pulleys adapted to convert a uniform velocity of a driving-shaft into varying velocities of a driven belt or to convert the uniform velocity of a driving-belt into varying velocities of a driven shaft.

The object of the invention is to provide an improved construction of expansible pulley which will be possessed of great rigidity and wherein the working diameter may be quickly and easily varied.

The invention preferably comprises two of the improved expansible pulleys arranged on parallel shafts and connected by a belt, whereby power will be transmitted from one shaft to the other. When two expansible pulleys are employed, the invention comprises devices for simultaneously varying their working diameters in inverse directions, whereby the relative speeds of rotation of the shafts will be changed. If a crossed belt is employed, when two expansible pulleys are used, with devices for simultaneously operating them, the belt will be maintained uniformly tight irrespective of the changes in the diameter of the two pulleys, since the increase in diameter of one will exactly compensate for the decrease in the diameter of the other.

The invention also comprises means for tightening the belt when necessary and for keeping it in a tight condition.

In carrying out our invention we employ an expansible pulley comprising, essentially, two intercalated cones movable toward and away from each other and each consisting of a series of ribs or bars which are connected at their outer or enlarged ends to tapering sheaths, into which work the bars or ribs of the companion cone, and means being provided to shift the cones relatively. When the invention comprises a pair of these expansible pulleys arranged on parallel shafts, one conical section of each pulley will be stationary with respect to the shaft, the other being movable longitudinally thereon, but rotating therewith. We employ a rock-shaft extending at right angles to the driving and driven shafts and carrying arms which are connected with the movable conical section of each expansible pulley. The movable section of one expansible pulley is arranged with respect to the corresponding section of the other so that when movement of both takes place in one direction by the operation of the rock-shaft the working diameter of one pulley will be increased, while the working diameter of the other will be decreased. Not only will this provide for changes in the speed of the belt, but in effecting a speed change the belt will be shifted always parallel to the plane of its driving movement, whereby if a crossed belt is used it will always be maintained tight.

When the invention comprises additional means for tightening the belt, we hang the rock-shaft from the driving and driven shafts and support one of the latter by a pair of links depending from a power-shaft or work-shaft, whereby the former may move radially with respect to the other. Power is communicated between these two shafts by suitable gearing which is unaffected by the radial movements—as, for example, by two engaging gears. In this way the two shafts carrying the expansible pulleys may be moved laterally with respect to each other to secure the proper tension of the belt without affecting the transmission of power either to or from the expansible pulleys or to or from each other.

In order that our invention may be better understood, attention is directed to the accompanying drawings, forming a part of this specification, and in which—

Figure 1 is a plan of an apparatus illustrating an embodiment of our invention, showing two shafts carrying the two conical pulleys with means for simultaneously adjusting them and showing in dotted and full lines the extreme position of the conical sections. In this view the chain-line illustrates the position of the belt when the expansible pulleys are in the position shown in full lines, while the dotted line illustrates the position of the belt when the sections of the expansible pulleys are in the position shown in dotted lines. Fig. 2 is a side elevation illustrating a power or work shaft and showing the preferred means for effecting the adjustment of the belt; Fig. 3, a section on the line 3 3 of Fig. 2, showing only a portion of one of the expansible pulleys; Fig. 4, a longitudinal section through the shaft A of Figs. 1 and 2, and Fig. 5 a plan view showing the conical sections C and D relatively separated.

In all of the above views corresponding parts are represented by the same letters of reference.

A and B represent the two shafts, the former being the driving-shaft and the latter the driven shaft. Each shaft carries an expanding pulley formed of two opposed conical members C D and E F. In the embodiment of the invention illustrated in the drawings each conical member is formed of a number of bars or ribs which constitute the conical surface, the bars of one member being intercalated between those of the other member of the pulley, the points of intersection forming, substantially, a V-groove, at the bottom of which the belt or band engages. The cones are carried upon their respective shafts in such a manner that one member of each pair is fixed thereupon and the other member capable of adjustment by axial movement upon the shaft. The members C and F in the present case are adjustable, and the members D and E are stationary. The axial adjustment of the conical members C and F is in the example illustrated effected simultaneously by connections operated from a rock-shaft G in such a manner that the belt travels axially parallel to itself and remains uniformly tight for all the attainable velocity ratios of the shafts A and B, as will be presently explained.

Figure 5:
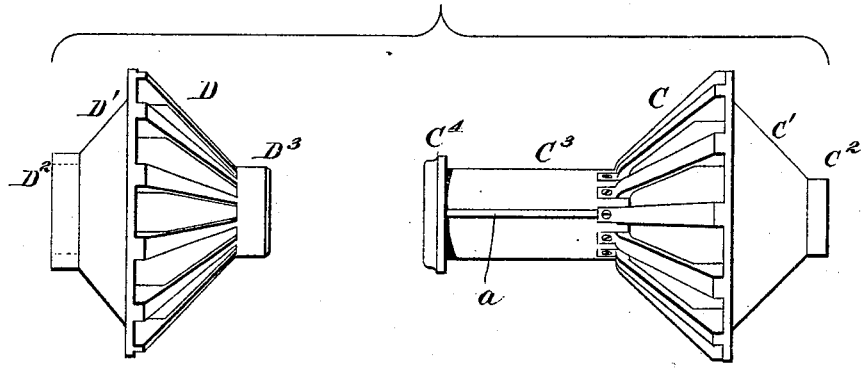

Regarding the preferred constructional details of the expansible pulleys, each set of the ribs or bars C, D, E, and F is supported at its larger circumference by a conical sheath C', D', E', and F', respectively. The sheaths of each conical member will, when the pulley is expanded, receive and cover the inner extremities of the companion members, as will be obvious. The inner extremities of the bars or ribs C unite to form or are secured to a sleeve $C^3$, and the inner end of the sheath C' is supported by a boss $C^2$, both the boss $C^2$ and sleeve $C^3$ being free to move axially upon the shaft A, but either or both being rotatively driven from the shaft in any suitable way, as from a feather A'. The sleeve $C^3$ terminates at $C^4$ in a collar, the purpose of which will be explained. The inner ends of the bars or ribs D of the other conical member unite to form a boss $D^3$, which is keyed or otherwise fixed to the shaft A, and the other ends are secured to the sheath D', whose smaller diameter forms or is connected to the collar $D^2$. The sleeve $C^3$ works within the collar $D^2$, but may be driven therefrom, if desired, by a key or feather $a$, as shown in Figs. 4 and 5. The bars C are thus driven from the shaft at the boss $C^2$ and at the sleeve $C^3$ through the feather A', and the bars D are driven through the boss $D^3$, either alone or in connection with a driving connection from the sleeve $C^3$ at the collar $D^2$.

The pulley carried by the shaft B is similar in construction to that on the shaft A, except that the bars E being fixed and the bars F adjustable axially the inner ends of the former terminate in a boss (not shown) fixed to the shaft instead of in a movable sleeve, while the sleeve $F^2$ at the small end of the sheath F' is capable of axial movement, as is also a sleeve (not shown) in which the inner ends of the bars F terminate.

The adjusting device for shifting the movable sections of each expansible pulley with respect to the stationary sections thereof comprises a rock-shaft G, operated by a hand-lever G' and carrying a sleeve H, splined to the shaft on a feather $H^2$, and a second sleeve J, fixed to said shaft. Each of these sleeves carries a pair of arms H' H' and J' J', respectively. The arms H' are pivoted to projections L' on a sleeve L, arranged to slide upon the shaft A, the latter rotating freely within it. The sleeve L engages the end of the collar $C^4$, so as to impart axial movement thereto without interfering with the rotation thereof. If desired, an antifriction-bearing may be interposed between the collar and sleeve. A similar connection is provided by a sleeve K, having projections K', within which the arms J' are pivoted, the said sleeve K engaging with and moving the sleeve $F^2$ of the movable member of the expansible pulley on the shaft B. The rock-shaft G will be thus supported from the shafts A and B through the links H' and J'. It is guided at its ends in bearings M and Q, as shown more particularly in Fig. 3, whereby a slight rise and fall of the shaft will be permitted. The bearing-box for the rock-shaft G, working in the bearing M, is shown at M', Fig. 2. The shaft A in this instance is suspended by links $b\ b$, as shown in Fig. 4, from a power or work shaft O, from which it is driven or which it itself drives, preferably, by toothed gearing O' $O^2$, as shown. By suspending the shaft A from the power or work shaft O by means of links $b\ b$, as explained, the shaft A may be swung relatively to tighten or loosen the belt, the extreme positions of the shaft being indicated in Fig. 2 by the reference-letters $A^2$ and $A^3$.

The operation will be as follows: The position shown in full lines in Fig. 1 illustrates the pulley C D at its smallest and the pulley E F at its largest diameter. If it is now desired to increase the velocity of the shaft B relatively to that of A, assuming that the former is driven from the latter, the lever G' is moved so as to cause the cone member C to approach the member D and the cone member F to recede from the member E. The extreme extent of this movement in this direction is shown in dotted lines in Fig. 1. The effect produced on the belt is to cause it to travel axially with the movable cones and parallel to its own plane of rotation, and if it is a crossed belt it will remain uniformly tight at all velocity ratios of A and B, since the increase of the working diameter at one of the expansible pulleys is compensated by a decrease in the working diameter at the other pulley. If it is desired to adjust the tightness of the belt, this may be effected by moving the shaft A about the center of the shaft O, causing the shafts A and B to separate. In this movement the sleeve H will slide axially on the shaft G, while the inclination of the latter will be slightly changed, the end bearings thereof working in the guides M and Q.

Having now described our invention, what we claim as new, and desire to secure by Letters Patent, is as follows:

1. In an expansible pulley, the combination of a conical section fixed against lateral movement, a conical section movable laterally, said conical sections comprising intercalated bars or ribs, a conical sheath for the movable section inverted with respect to the same, and a sleeve to which the inner ends of the movable section are secured, substantially as set forth.

2. In an expansible pulley, the combination of a conical section fixed against lateral movement, a conical section movable laterally, said conical sections comprising intercalated bars or ribs, a conical sheath for the movable section inverted with respect to the same, a sleeve to which the inner ends of the movable section are secured, and means for moving said sleeve to vary the working diameter of the pulley, substantially as set forth.

3. The combination of two expansible pulleys, each comprising two intercalated conical sections, one section of each set being stationary, the stationary element of one set being reverse to that of the other set, whereby when the movable sections of both sets are moved longitudinally in one direction or the other the line of the working diameter of both pulleys will be shifted in parallelism, substantially as set forth.

4. The combination of two expansible pulleys, each comprising two intercalated conical sections, one section of each set being stationary, the stationary element of one set being reverse to that of the other set, whereby when the movable sections of both sets are moved longitudinally in one direction or the other the line of the working diameter of both pulleys will be shifted in parallelism, and means for simultaneously shifting the movable section of each pulley, substantially as set forth.

5. The combination of two expansible pulleys, each comprising two intercalated conical sections, one section of each set being stationary, the stationary element of one set being reverse to that of the other set, whereby when the movable sections of both sets are moved longitudinally in one direction or the other the line of the working diameter of both pulleys will be shifted in parallelism, a rock-shaft, and connections between said rock-shaft and the movable sections of both pulleys, whereby the latter may be shifted simultaneously, substantially as set forth.

6. The combination of two expansible pulleys, each comprising two intercalated conical sections, one section of each set being stationary, the stationary element of one set being reverse to that of the other set, whereby when the movable sections of both sets are moved longitudinally in one direction or the other the line of the working diameter of both pulleys will be shifted in parallelism, and means for moving the pulleys toward and away from each other for adjusting the tension of a belt between them, substantially as set forth.

7. The combination of two expansible pulleys, each comprising two intercalated conical sections, one section of each set being stationary, the stationary element of one set being reverse to that of the other set, whereby when the movable sections of both sets are moved longitudinally in one direction or the other the line of the working diameter of both pulleys will be shifted in parallelism, a rock-shaft, connections between the rock-shaft and the movable section of each pulley for shifting the same, and means for moving one pulley laterally with respect to the rock-shaft, whereby the tension of a belt may be varied, substantially as set forth.

8. The combination of two expansible pulleys, each comprising two intercalated conical sections, one section of each set being stationary, the stationary element of one set being reverse to that of the other set, whereby when the movable sections of both sets are moved longitudinally in one direction or the other the line of the working diameter of both pulleys will be shifted in parallelism, and a rock-shaft having arms which are attached to the movable section of each pulley and from which the rock-shaft will be supported, substantially as set forth.

9. The combination of two expansible pulleys, each comprising two intercalated conical sections, one section of each set being stationary, the stationary element of one set being reverse to that of the other set, whereby when the movable sections of both sets are moved longitudinally in one direction or the other the line of the working diameter of both pulleys will be shifted in parallelism, a rock-shaft having arms which are attached to the movable section of each pulley and from which the rock-shaft will be supported, and end bearings for said rock-shaft permitting vertical movements thereof, substantially as set forth.

10. The combination of two expansible pulleys, each comprising two intercalated conical sections, one section of each set being stationary, the stationary element of one set being reverse to that of the other set, whereby when the movable sections of both sets are moved longitudinally in one direction or the other the line of the working diameter of both pulleys will be shifted in parallelism, a rock-shaft having arms which are attached to the movable section of each pulley and from which the rock-shaft will be supported, end bearings for said rock-shaft permitting vertical movements thereof, and means for shifting one of the pulleys toward and away from the other to adjust the tension of a belt, causing the ends of the rock-shaft to be moved in the bearings therefor, substantially as set forth.

11. The combination of two expansible pulleys, each comprising two intercalated conical sections, one section of each set being stationary, the stationary element of one set being reverse to that of the other set, whereby when the movable sections of both sets are moved longitudinally in one direction or the other the line of the working diameter of both pulleys will be shifted in parallelism, a rock-shaft having arms which are attached to the movable section of each pulley and from which the rock-shaft will be supported, end bearings for said rock-shaft permitting vertical movements thereof, means for shifting one of the pulleys toward and away from the other to adjust the tension of a belt, causing the ends of the rock-shaft to be moved in the bearings therefor, and a power or work shaft with respect to which the adjustable pulley is radially movable, substantially as set forth.

This specification signed and witnessed this 10th day of April, 1899.

THOS. A. EDISON.

This specification signed and witnessed this 28th day of March, 1899.

CHARLES M. JOHNSON.

Witnesses to signature of Thomas A. Edison:

J. F. RANDOLPH,
ARCHIBALD G. REESE.

Witnesses to signature of Charles M. Johnson:

THOMAS JEFFREY,
JAMES ALEXANDER.